US009880278B2

(12) United States Patent
van Uffelen et al.

(10) Patent No.: US 9,880,278 B2
(45) Date of Patent: Jan. 30, 2018

(54) OBJECT DETERMINATION USING A RADAR SENSOR

(71) Applicant: Robert Bosch GmbH, Stuttgart (DE)

(72) Inventors: Raphael van Uffelen, Bietigheim-Bissingen (DE); Alexander Steinmetz, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 588 days.

(21) Appl. No.: 14/448,892

(22) Filed: Jul. 31, 2014

(65) Prior Publication Data
US 2015/0035694 A1   Feb. 5, 2015

(30) Foreign Application Priority Data
Aug. 1, 2013   (DE) .......................... 10 2013 215 117

(51) Int. Cl.
*G01S 13/93* (2006.01)
*G01S 13/04* (2006.01)
*G01S 13/18* (2006.01)

(52) U.S. Cl.
CPC ............ *G01S 13/931* (2013.01); *G01S 13/04* (2013.01); *G01S 13/18* (2013.01); *G01S 2013/9325* (2013.01)

(58) Field of Classification Search
CPC ........ G01S 13/931; G01S 13/18; G01S 13/04; G01S 2013/9314–2013/9396
See application file for complete search history.

(56) References Cited

U.S. PATENT DOCUMENTS

| 5,689,264 | A   | * | 11/1997 | Ishikawa   | G01S 17/936 342/70 |
| 6,085,151 | A   | * | 7/2000  | Farmer     | G01S 7/023 342/70 |
| 6,970,129 | B2  | * | 11/2005 | Kumon      | G01S 13/345 342/109 |
| 7,605,746 | B2  | * | 10/2009 | Matsuura   | G01S 7/4802 342/70 |
| 8,933,834 | B2  | * | 1/2015  | Nakanishi  | G01S 13/931 342/104 |
| 9,261,590 | B1  | * | 2/2016  | Brown      | G01S 13/10 |
| 2006/0289216 | A1 | * | 12/2006 | Kato     | B60T 7/22 180/169 |
| 2008/0186224 | A1 | * | 8/2008  | Ichiyanagi | G01S 13/347 342/109 |

* cited by examiner

*Primary Examiner* — Matthew M Barker
(74) *Attorney, Agent, or Firm* — Norton Rose Fulbright US LLP; Gerard Messina

(57) ABSTRACT

A method for determining an object in a surroundings of a motor vehicle includes: scanning a far range, which extends as of a predetermined minimum distance from the radar sensor, using a radar sensor for scanning the far range; detecting objects in the far range based on reflections of a radar signal emitted by the radar sensor; and determining a crossing object in a close range, which lies between the radar sensor and the far range, if a previously detected object is no longer able to be detected in the far range using the radar sensor.

15 Claims, 3 Drawing Sheets

US 9,880,278 B2

OBJECT DETERMINATION USING A RADAR SENSOR

BACKGROUND OF THE INVENTION

1. Field of the Invention

The present invention generally relates to a technique for determining an object using a radar sensor, and particularly relates to determining an object crossing in the close range ahead of a vehicle.

2. Description of the Related Art

A motor vehicle has a radar sensor for detecting one or more objects. For this detection, the radar sensor emits a radar signal which is able to be reflected at an object and returned to the radar sensor. The reflected signal arriving at the radar sensor is correlated with the emitted signal, and the object is able to be detected. In this context, a distance and/or a speed of the object with respect to the radar sensor may preferably be determined. Such a system may be used particularly within the scope of a driver assistance system which, for example, is supposed to maintain a predetermined distance of the motor vehicle from a preceding motor vehicle. In another example, the system is able to be included in an assistance system for the autonomous or partially autonomous guidance of the motor vehicle.

The radar sensors used are usually not suitable for determining an object in a close range which extends a few meters from the radar sensor. To detect an object in the close range, a different sensor is normally used, for example, an ultrasonic sensor or a video camera. In spite of that, monitoring the close range, especially with respect to a movable object, which crosses the direction of motion of the motor vehicle may be desirable. For instance, a railroad engine driver on a locomotive is frequently not able to have a look at a region lying directly in front of the locomotive. The starting of the locomotive, while a person is crossing the track, cannot be prevented using a usual radar sensor. An assistant for starting travel of a motor vehicle, for instance, in stop-and-go traffic, also has to scan a close range in order to determine whether, for example, a preceding motor vehicle has left the route or not.

BRIEF SUMMARY OF THE INVENTION

It is therefore the object of the present invention to provide a method, a computer program product and a device for determining an object in a close range in front of a motor vehicle, which function on the basis of a usual radar sensor.

A motor vehicle includes a radar sensor. The surroundings of the motor vehicle are subdivided into a far range, which extends as of a predetermined minimum distance from the radar sensor, and a close range which lies between the radar sensor and the far range. A method for determining an object crossing in the close range includes the steps of scanning the far range using the radar sensor, the detecting of objects in the far range, based on reflections of a radar signal emitted by the radar sensor, and determining the crossing object in the close range when a previously detected object in the far range is no longer able to be detected using the radar sensor.

The object is thus determined on the basis of its shadowing of other objects, even when the object itself is not able to be detected at all, such as with respect to its extension, its speed or the direction of its motion. By concluding that there is an object in the close range with the aid of the determinability of objects in the far range, it is possible to use a usual radar sensor below its physical or product-specific minimum range. A region of the surroundings of the motor vehicle in which an object is able to be determined, may thus also be enlarged without the aid of other sensors. The object is especially able to be determined if it is moving transversely or slantwise to an output direction of the radar signal. The output direction may coincide with a direction of motion of the motor vehicle. Thus, the object may be detected alternatively at the moving or the stationary motor vehicle.

The object may advantageously be detected in the close range already based on one single measurement. A plausibility check with the aid of several measurements one after another, as is usually required for detecting distant objects, may be omitted. Thus, the region near the motor vehicle that is particularly in danger of an accident may very quickly be investigated for crossing objects.

In one preferred specific embodiment, only objects in the far range are detected which are evaluated as being relevant for the motor vehicle. The relevance of each object in the far range may be yielded particularly by a measurement quality, a state of motion of the object or its position with respect to the motor vehicle. By rejecting certain objects as irrelevant, an improved determination may take place as to whether an object is able to be detected using the radar sensor. The spatial resolution of the method may thus be increased.

In one specific embodiment, the object is determined in the close range if the number of objects, that are no longer detectable in the far range having a predetermined speed, changes. This corresponds to looking at a differential proportion of the curve of the number of objects in the far range. A slow change in this number, as may take place during cornering, for example, is thus not able to lead to an erroneous determination of the object in the close range. The quality of the determination may thus be increased.

The object in the close range may also be determined if a predetermined proportion of the previously detected objects is no longer able to be detected. Thus a statistical evaluation of the objects in the far range may take place, from which one may draw conclusions on the object in the close range. A spatial distribution of the objects in the far range may remain without consideration, in this case. So, the determination of the object in the close range may thus be further improved.

The object in the close range may also be determined if the sum of the numbers of objects that are no longer detectable exceeds a predetermined threshold value over a predetermined number of past scans. This corresponds to looking at an integral proportion of the number of detectable objects. The object in the close range may thus be determined particularly early.

One may also look at a combination of the differential proportion, the integral proportion and the relative number of detectable objects, in order to determine the object in the close range as quickly and as selectively as possible.

Furthermore, a travel situation of the motor vehicle may be determined and the object in the close range may be determined with the aid of the travel situation. This corresponds to a situational evaluation, which may be carried out for scanning the surroundings of the motor vehicle, already for other reasons. In this context, particularly heuristic and experiential values may enter into the determination of the object, which may be derived from the travel situation.

A computer program product, according to the present invention includes program code means for carrying out the described method when the computer program product is run on a processing device or stored on a computer-readable data carrier.

A device, according to the present invention, for determining an object in the surroundings of a motor vehicle, includes a radar sensor for scanning a far range, which extends as of a predetermined minimum distance from the radar sensor, and a processing device for detecting objects in the far range, based on reflections of a radar signal output by the radar sensor. In this context, the processing device is prepared for determining a crossing object in a close range, which lies between the radar sensor and the far range, when a previously detected object in the far range is no longer able to be detected using the radar sensor.

In this context, the radar sensor preferably includes a frequency modulated continuous wave radar. Thereby, distances and relative speeds of distant objects are able to be determined quickly with high resolution.

The radar sensor is preferably prepared to scan objects in the far range, the far range beginning at a minimum distance of ca. 4 m from the radar sensor. Reflections of objects which are closer than the far range, are usually separated out already during the signal processing.

DETAILED DESCRIPTION OF THE INVENTION

Figure 1:
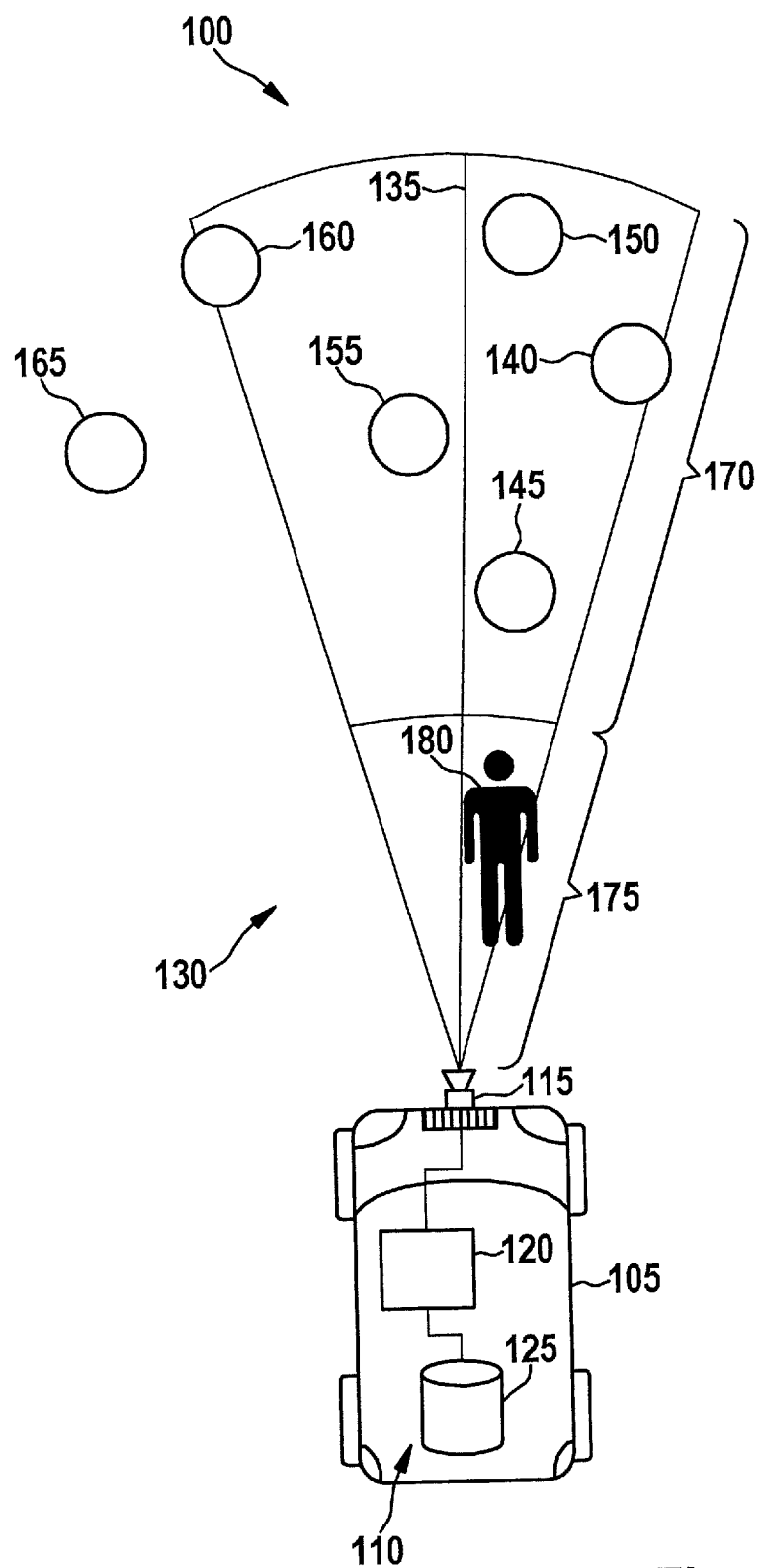
FIG. 1 shows a motor vehicle having a radar sensor.

FIG. 1 shows a system 100 of a motor vehicle 105 having a device 110 installed on board. Device 110 includes a radar sensor 115, a processing device 120 and optionally, a memory 125. The motor vehicle may particularly be a passenger car or a truck or even a rail vehicle.

Radar sensor 115 is prepared to scan surroundings 130 of the motor vehicle. For this purpose, radar sensor 115 is prepared to output a radar signal along a longitudinal axis 135, which preferably coincides with a direction of motion of motor vehicle 105. In surroundings 130 of motor vehicle 105 there may be objects which reflect the radar signal back to radar sensor 115. In a far range 170, which extends from a predetermined minimum distance of ca. 4 m, for instance, from radar sensor 115, there are six exemplary objects 140 to 165. In a close range 175, which is between far range 170 and radar sensor 115, there is an additional object 180, which is represented as a person in exemplary fashion.

A distinction is generally made between a measurable object 180 and an object that may be followed. First of all, a reflected signal of object 180 has to be recorded in order to measure object 180. By evaluation a plurality of measurements that took place at different times, object 180 may then also be followed. The usual systems work only with objects 180 that are able to be followed. If an object 180 is located in the close range, measuring it may be possible, but following it is not possible. For example, an available measuring period may be too short to carry out a sufficient number of measurements of object 180. The measuring period is determined by a speed at which object 180 is moving with respect to radar sensor 115, and the speed of radar sensor 115 in the direction of the path of motion of object 180. One has to make certain that object 180 is detected in time, in order still to be able to carry out a measure for avoiding a collision successfully. In the surroundings of a motor vehicle 105, whose collision with a crossing pedestrian, for example, is to be prevented, the far range, which makes following possible, usually begins at a distance of ca. 4 m from radar sensor 115.

The detection range of radar sensor 115 may be restricted to objects which lie within a predetermined circular segment that includes longitudinal axis 135. Sixth object 165 lies outside the detection range, and may remain undetected by radar sensor 115. A further restriction for the detectability of objects may originate with their distance from radar sensor 115. A reflected radar signal of object 180 in close range 175 may not be able to be evaluated with measuring techniques or may be rejected for other reasons during processing, so that object 180 itself is not able to be detected using radar sensor 115, such as for determining its position or speed.

In order to determine that object 180 is crossing in close range 175, that is, that it is moving transversely or at an acute angle to longitudinal axis 135, the determination of objects 145 to 160 may take place cyclically and detected objects 145 to 160 may be followed up by filing specific data on these objects 145 to 160 in memory 125, for example. If object 180 moves laterally into close range 175, objects 140 to 150 which, as seen by radar sensor 115, lie behind object 180, are not able to be detected, although they are in far range 170. Based on the shadowing of objects 140 to 150, processing device 120 is able to conclude that object 180 is there. That is why a detection, based on measuring technology, of object 180 by radar sensor 115 is not required.

Figure 2:
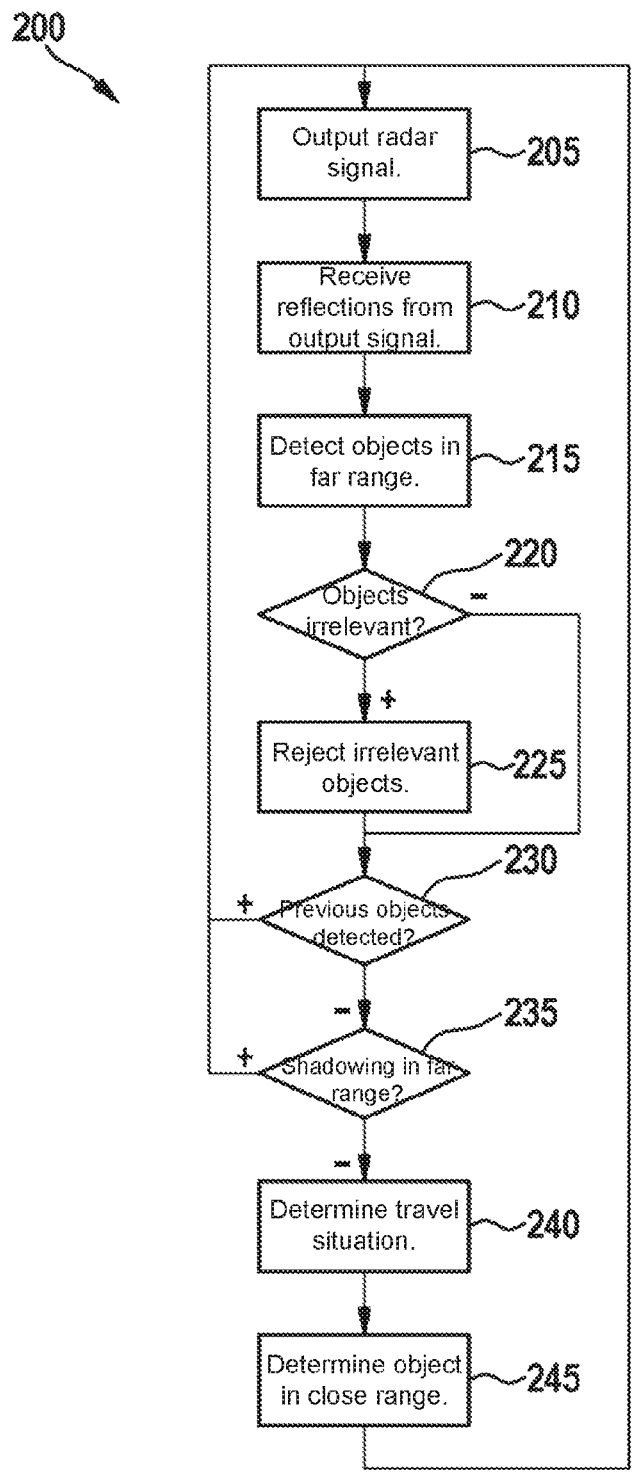
FIG. 2 shows a flow chart of a method for object determination at the motor vehicle of FIG. 1.

FIG. 2 shows a flow chart of a method 200 for determining crossing object 180 in close range 175 of radar sensor 115 on board motor vehicle 105 of FIG. 1. Method 200 is particularly prepared to be carried out on processing device 120. In a first step 205, a radar signal is output by radar sensor 115. In a subsequent step 210, reflections of the output radar signal are received. The reflections are returned by objects 140 to 160 in far range 170 of radar sensor 115. In one preferred specific embodiment, radar sensor 115 works as a frequency modulated continuous wave radar, steps 205 and 210 being carried out permanently. In other specific embodiments, these steps may also be carried out one after the other.

Preferably at regular intervals, in step 215, objects 140 to 160 in far range 170 are detected based on a correlation of the output radar signals with the reflected radar signals. The detection is able to include the providing of a plurality of data on respective object 140 to 160. For example, a measuring time, the amplitude of the reflected signal, a removal, an expansion, a speed, a position of the respective object with respect to radar sensor 115 or additional data may be determined. A representation of the respective object 140 to 160 may be stored in memory 125. This process may take place for each of objects 140 to 160. A corresponding representation of each object 140 to 160 may be stored in memory 125.

In an optional step 215, which may be integrated with step 210, it is checked whether one of objects 140 to 160 is irrelevant. The irrelevance of an object 140 to 160 may come about, for instance, from its direction of motion and speed of motion, its position with respect to motor vehicle 105 or a measuring quality which is able to be derived from the signal strength of the reflected signal. For objects 140 to 160, that are determined to be irrelevant, step 225 is carried out in which these objects 140 to 160 are rejected. All other objects 140 to 160 are not affected by this.

In a step 230 it is checked whether all objects 140 to 160, which were detected at a preceding run-through of method 200, especially of step 215, have again been detected in the current run-through. If this is the case, method 200 may branch back to step 205, and run through again. Otherwise it may be determined, optionally in a step 235, whether the shadowing of one of the objects 140 to 160 has taken place based on another object 140 to 160 in the far range. In the illustration of FIG. 1, for example, object 150 may be shadowed by object 145, even if object 180 is not staying in close range 175. If there is a shadowing by an object 140 to 160 in far range 170, method 200 is able to return to step 205 and run through again.

Otherwise a travel situation of motor vehicle 105 may be determined in an optional step 240. A determination of object 180 in close range 175, carried out in a subsequent step 245, is then able to take place based on the travel situation. For this purpose, the covering of objects 140 to 160 in individual segments of the detection range of radar sensor 115, especially a directional angle with respect to longitudinal axis 135 and the distance from radar sensor 115, may be taken into account. In addition, situational characteristic variables, such as the number and spatial distribution of objects 140 to 160, an average distance or a measuring quality of these objects 140 to 160 may be observed. Parameters of motion of motor vehicle 105, particularly a direction of motion, a speed of motion and an acceleration may be taken into account. One or more of these indicators may be weighted as a function of the travel situation and compared to one another. The position of object 180 in close range 175 may thereby be determined more accurately.

Figure 3:
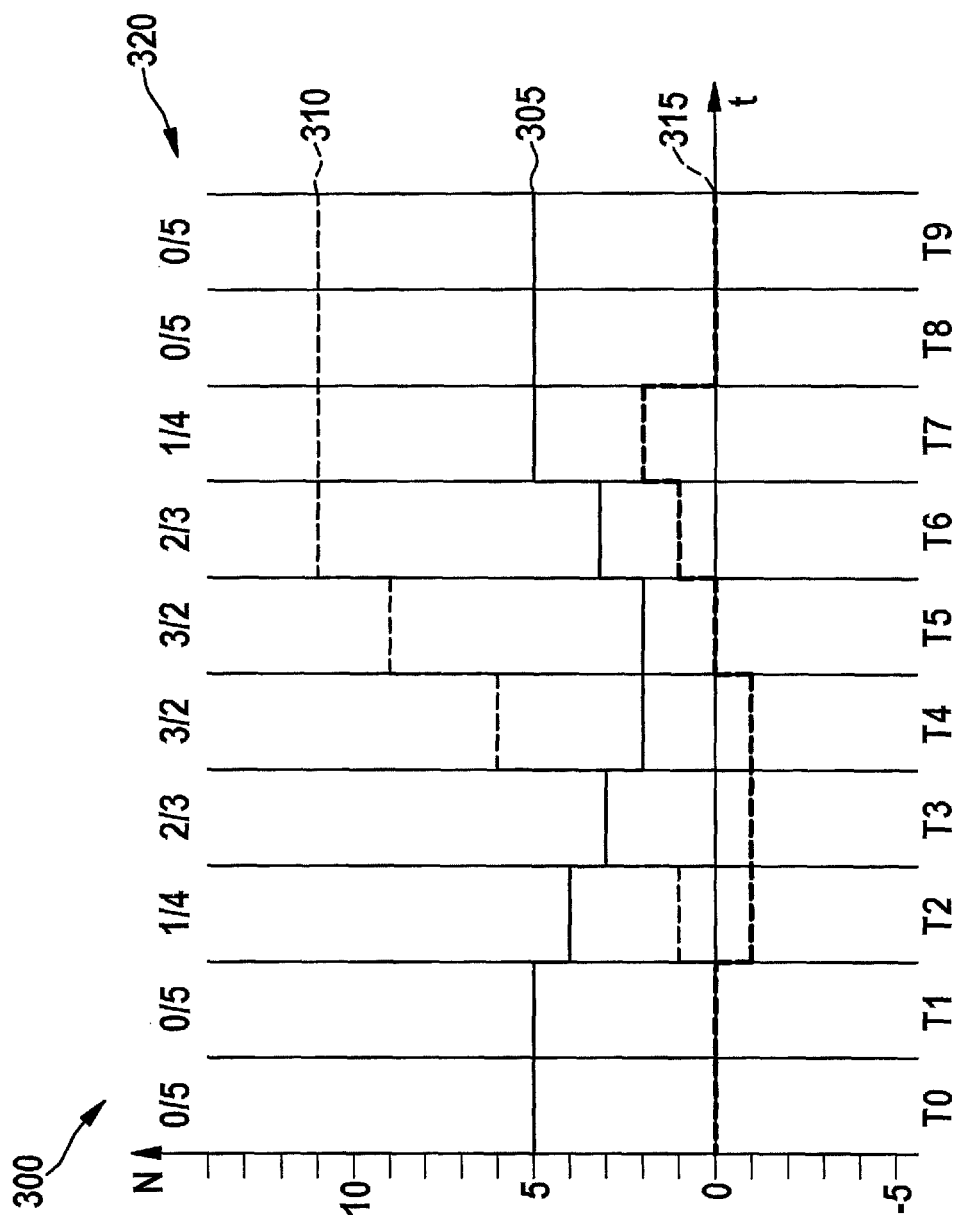
FIG. 3 shows curves of detectablities of objects in the far range at the motor vehicle of FIG. 1.

In step 245, object 180 may also be determined, additionally or alternatively, based on a statistical evaluation. FIG. 3 shows a plot 300 of detection abilities of objects 140 to 160 in far range 170 of radar sensor 115 on motor vehicle 105 of FIG. 1. In the horizontal direction time is plotted, subdivided into equidistant measuring periods T0 to T9. A number is plotted in the vertical direction.

A first curve 305 relates to a number of objects 140 to 160, which are detectable by radar sensor 115 in far range 170. At the beginning this number is 5, and then it goes down to 2, in the range of measuring periods T4 and T5, and subsequently rises again to 5. A second curve 310 relates to an integral proportion of first curve 305. Each deviation of curve 305 from the number of objects 140 to 160 in measuring period T0 is summed up. The integration time, that is, the number of previous measuring periods T0 to T9, which are taken into account for the integration, is at least 8 in the present illustration, so that a drop in curve 310 is not able to be observed, if the number of objects 140 to 160 in first curve 305 does not change.

A third curve 315 relates to a differential proportion of first curve 305. Third curve 315 has a value in each measuring period T0 to T9, which expresses by how much the value of first curve 305 differs in the same measuring period from its value in the preceding measuring period. A high value of third curve 315 indicates a rapid change in the number of detectable objects 140 to 160. A fourth curve 320 is reproduced numerically and indicates a relative proportion of detectable objects 140 to 160. For each measuring period T0 to T9, it is indicated how many of objects 140 to 160 are shadowed and how many are detectable without shadowing. The two values are in each case separated from each other by a slash.

Within the scope of a statistical evaluation, which in particular is able to be carried out in step 245 of method 200 of FIG. 2, each of curves 305 to 320 may be investigated and may especially be compared to a threshold value. If one or more of curves 305 to 320 exceed their associated threshold value, a conclusion may be drawn on object 180 being in close range 175 of radar sensor 115 on board of motor vehicle 105 of FIG. 1. The statistical observation described may be carried out, in addition or alternatively to the situational evaluation described above with respect to steps 240 and 245.

What is claimed is:

1. A method for determining an object in a surroundings of a motor vehicle, comprising:
   scanning a far range of the surroundings using a radar sensor for scanning the far range, wherein the far range begins at a predetermined minimum distance from the radar sensor;
   detecting, for each of a plurality of time periods, objects in the far range based on reflections of a radar signal emitted by the radar sensor;
   comparing, for at least one of the plurality of time periods, to at least one corresponding threshold value, at least one of: a proportion of a number of the detected objects in the far range in at least one previous time period still detected in the at least one time period, a sum over the at least one time period and a predetermined number of previous time periods of a number of objects no longer able to be detected in the far range relative to a number of objects detected in the far range for at least one previous time period, or a change in the number of the detected objects in the far range relative to a number of detected objects in the far range for at least one previous time period; and
   determining a presence of a crossing object in a close range, which lies between the radar sensor and the far range, as a function of the comparing.

2. The method as recited in claim 1, wherein only objects in the far range which are valued as relevant for the motor vehicle are detected.

3. The method as recited in claim 2, wherein relevance of detected objects is determined based on at least one of: directions of motion of the detected objects, speeds of the detected objects, or positions of the detected objects with respect to the motor vehicle.

4. The method as recited in claim 1, wherein the presence of the crossing object is determined in the close range if the number of objects no longer able to be detected in the far range changes at least at a predetermined speed.

5. The method as recited in claim 1, wherein the presence of the crossing object is determined in the close range if a predetermined proportion of previously detected objects is no longer able to be detected.

6. The method as recited in claim 1, wherein the crossing object is determined in the close range if a number of objects no longer detectable exceeds a predetermined threshold value over a predetermined number of past scans.

7. The method as recited in claim 1, wherein the presence of the crossing object is determined if the proportion falls below the at least one corresponding threshold value.

8. The method as recited in claim 1, wherein the presence of the crossing object is determined if the sum rises above the at least one corresponding threshold value.

9. The method as recited in claim 1, wherein the presence of the crossing object is determined if the change in the number of detected objects in the far range rises above the at least one corresponding threshold value.

10. The method as recited in claim 1, wherein the detecting, comparing and determining are conducted repeatedly at predetermined time intervals.

11. The method as recited in claim 1, further comprising storing a representation of each of the detected objects in a memory.

12. A non-transitory, machine-readable medium storing program instructions, which when executed by a processor cause the processor to perform a method for determining an object in a surroundings of a motor vehicle, the method comprising:

scanning a far range of the surroundings using a radar sensor for scanning the far range, wherein the far range begins at a predetermined minimum distance from the radar sensor;

detecting, for each of a plurality of time periods, objects in the far range based on reflections of a radar signal emitted by the radar sensor;

comparing, for at least one of the plurality of time periods, to at least one corresponding threshold value, at least one of: a proportion of a number of the detected objects in the far range in at least one previous time period still detected in the at least one time period, a sum over the at least one time period and a predetermined number of previous time periods of a number of objects no longer able to be detected in the far range relative to a number of detected objects in the far range for at least one previous time period, or a change in the number of the detected objects in the far range relative to a number of detected objects in the far range for at least one previous time period; and determining a presence of a crossing object in a close range, which lies between the radar sensor and the far range, as a function of the comparing.

13. A device for determining an object in a surroundings of a motor vehicle, comprising:

a radar sensor for scanning a far range of the surroundings, wherein the far range begins at a predetermined minimum distance from the radar sensor; and a processing device configured to:

detect, for each of a plurality of time periods, objects in the far range based on reflections of a radar signal emitted by the radar sensor;

compare, for at least one of the plurality of time periods, to at least one corresponding threshold value, at least one of: a proportion of a number of the detected objects in the far range in at least one previous time period still detected in the at least one time period, a sum over the at least one time period and a predetermined number of previous time periods of a number of objects no longer able to be detected in the far range relative to a number of detected objects in the far range for at least one previous time period, or a change in the number of the detected objects in the far range relative to a number of detected objects in the far range for at least one previous time period; and determine a presence of a crossing object in a close range, which lies between the radar sensor and the far range, as a function of the comparing.

14. The device as recited in claim 13, wherein the radar sensor includes a frequency modulated continuous wave radar.

15. The device as recited in claim 14, wherein the radar sensor scans objects in the far range which begins at a minimum distance of approximately 4 meters from the radar sensor.

* * * * *